United States Patent
Munro et al.

(10) Patent No.: US 11,123,726 B2
(45) Date of Patent: Sep. 21, 2021

(54) METHOD OF PREPARING A MOLECULAR CATALYST

(71) Applicant: Univation Technologies, LLC, Houston, TX (US)

(72) Inventors: Ian M. Munro, Freeport, TX (US); Roger L. Kuhlman, Lake Jackson, TX (US); Angela I. Padilla-Acevedo, Lake Jackson, TX (US)

(73) Assignee: UNIVATION TECHNOLOGIES, LLE, Houston, TX (US)

( * ) Notice: Subject to any disclaimer, the term of this patent is extended or adjusted under 35 U.S.C. 154(b) by 204 days.

(21) Appl. No.: 16/343,033

(22) PCT Filed: Sep. 26, 2017

(86) PCT No.: PCT/US2017/053445
§ 371 (c)(1),
(2) Date: Apr. 18, 2019

(87) PCT Pub. No.: WO2018/080690
PCT Pub. Date: May 3, 2018

(65) Prior Publication Data
US 2020/0047173 A1    Feb. 13, 2020

Related U.S. Application Data

(60) Provisional application No. 62/413,505, filed on Oct. 27, 2016.

(51) Int. Cl.
| | |
|---|---|
| C08F 4/64 | (2006.01) |
| C08F 4/76 | (2006.01) |
| B01J 37/04 | (2006.01) |
| B01J 31/14 | (2006.01) |
| B01J 31/38 | (2006.01) |

(52) U.S. Cl.
CPC .......... *B01J 37/04* (2013.01); *B01J 31/143* (2013.01); *B01J 31/38* (2013.01); *B01J 2231/12* (2013.01); *C08F 4/64* (2013.01)

(58) Field of Classification Search
CPC ...... B01J 37/0045; B01J 31/38; B01J 31/143; C08F 4/64
See application file for complete search history.

(56) References Cited

U.S. PATENT DOCUMENTS

| | | | |
|---|---|---|---|
| 5,919,983 A | 7/1999 | Rosen et al. | |
| 5,977,251 A | 11/1999 | Kao et al. | |
| 6,034,022 A | 3/2000 | McAdon et al. | |
| 6,319,989 B1 | 11/2001 | Anderson et al. | |
| 6,683,149 B2 | 1/2004 | Jain et al. | |
| 6,689,847 B2* | 2/2004 | Mawson | C08F 10/00 526/116 |
| 8,058,373 B2 | 11/2011 | Stevens et al. | |
| 9,234,060 B2* | 1/2016 | Kao | C08F 210/16 |
| 9,714,305 B2* | 7/2017 | Wagner | C08F 10/00 |
| 2002/0119890 A1* | 8/2002 | Wenzel | C08F 10/00 502/439 |
| 2004/0010103 A1 | 1/2004 | Boussie et al. | |
| 2005/0032992 A1 | 2/2005 | Floyd et al. | |

FOREIGN PATENT DOCUMENTS

| | | |
|---|---|---|
| WO | 2007136494 A2 | 11/2007 |
| WO | 2013070601 A2 | 5/2013 |
| WO | 2016003878 | 1/2016 |

\* cited by examiner

*Primary Examiner* — Rip A Lee

(57) ABSTRACT

Method of preparing a molecular catalyst from a mixture comprising a $(C_5-C_7)$alkane, a spray-dried alkylaluminoxane, and a molecular procatalyst. Molecular catalysts prepared by the method may be screened.

9 Claims, No Drawings

METHOD OF PREPARING A MOLECULAR CATALYST

FIELD

The field includes a method of preparing a molecular catalyst.

INTRODUCTION

WO 2013/070601 A2 to S.-C. Kao, et al. relates to methods of preparing a catalyst system comprising a spray-dried activator and to polymerization processes employing these catalyst systems. In one embodiment ("Method A", [00155]), sample catalyst systems were prepared using a "'simple dip'" procedure using Kaydol oil, a mineral oil; procatalyst component(s); and spray-dried methylaluminoxane or supported methylaluminoxane. The spray-dried methylaluminoxane was prepared from a stirred mixture of a toluene solution of methylaluminoxane and fumed silica (CAB-O-SIL TS-610) in a feed tank using an atomizing device [00152].

SUMMARY

We (the present inventors) discovered that productivity of molecular catalysts that have been prepared from molecular procatalysts and spray-dried alkylaluminoxane particles are quite sensitive to the morphology of the particles and solvent used in the preparation. Using an aromatic hydrocarbon liquid such as toluene in a "simple dip" procedure undesirably dissolves the alkylaluminoxane, thereby destroying the morphology of the particles and decreasing productivity of the molecular catalysts prepared therewith. Running the simple dip procedure with a light mixture of higher alkanes (e.g., white mineral oil, CAS 8042-47-5) instead of toluene results in molecular catalysts with variable catalyst productivity data from polymerization run to polymerization run under identical conditions and monomer(s). This variability confounds attempts to screen molecular catalysts. For example, it is difficult to use the data to determine which one of the resulting molecular catalysts is better or what is optimal loading of a particular molecular procatalyst.

We conceived a technical solution that comprises a method of preparing a molecular catalyst from a mixture comprising a $(C_5-C_7)$alkane, a spray-dried alkylaluminoxane, and a molecular procatalyst. Molecular catalysts prepared by the method may be screened or used to catalyze polymerizations at any reaction scale.

DETAILED DESCRIPTION

The Summary and Abstract are incorporated here by reference. Examples of embodiments include the following numbered aspects.

Aspect 1. A method of preparing a molecular catalyst, the method comprising mixing under activating conditions a molecular procatalyst, a spray-dried alkylaluminoxane on hydrophobic fumed silica (sdAAO/HFS), and a $(C_5-C_7)$alkane to give a catalyst system comprising a molecular catalyst in the $(C_5-C_7)$alkane.

Aspect 2. The method of aspect 1 wherein the $(C_5-C_7)$alkane is a $(C_5)$alkane, a $(C_6)$alkane, or a mixture of a $(C_5)$alkane and a $(C_6)$alkane.

Aspect 3. The method of aspect 1 or 2 wherein the $(C_5-C_7)$alkane is hexane, pentane, or a mixture of hexane and pentane.

Aspect 4. The method of any one of aspects 1 to 3 wherein (i) the alkylaluminoxane is methylaluminoxane (MAO); (ii) the hydrophobic fumed silica is a treated fumed silica prepared by treating an untreated fumed silica with a treating effective amount of a treating agent reactive with silicon-bonded hydroxyl groups; or (iii) both (i) and (ii).

Aspect 5. The method of aspect 4 wherein the treating agent reactive with silicon-bonded hydroxyl groups is hexamethyldisilazane; a cyclic silazane; a combination of hexamethyldisilazane and a cyclic silazane; a combination of hexamethyldisilazane in a silicone oil; a $(C_5-C_{10})$alkyltrialkoxysilane; an alkylchlorosilane of formula $R_xSiCl_{(4-x)}$, wherein subscript x is an integer of 0, 1, 2, or 3; and each R is independently a $(C_1-C_{10})$alkyl; an alkylhydridosilane of formula $R_ySiH_{(4-y)}$, wherein subscript y is an integer of 0, 1, 2, or 3; and each R is independently a $(C_1-C_{10})$alkyl; or a combination of any two or more thereof.

Aspect 6. The method of aspect 5 wherein the treating agent reactive with silicon-bonded hydroxyl groups is hexamethyldisilazane; a combination of hexamethyldisilazane and octamethylcyclotetrasilazane; a combination of hexamethyldisilazane in a bis[trimethylsilyl-endcapped] polydimethylsiloxane liquid; octyltrimethoxysilane; octyltriethoxysilane; dimethyldichlorosilane; or octylsilane.

Aspect 7. The method of any one of aspects 1 to 6 wherein the molecular procatalyst is a (i) a cyclopentadienyl ligand-metal complex procatalyst or (ii) a cyclopentadienyl-free ligand-metal complex procatalyst; and the molecular catalyst is a product of an activation reaction of (i) or (ii) with the sdAAO/HFS.

Aspect 8. The method of any one of aspects 1 to 7 further comprising replacing the $(C_5-C_7)$alkane of the mixture of a molecular catalyst and the $(C_5-C_7)$alkane with a mineral oil to give a mixture of the molecular catalyst and the mineral oil that is free of the $(C_5-C_7)$alkane.

Aspect 9. The method of any one of aspects 1 to 8 further comprising contacting a catalytic amount of the molecular catalyst with at least one polymerizable olefin under polymerization conditions to give a polyolefin product. The contacting comprises a polymerization run.

Aspect 10. The method of aspect 9 wherein the at least one polymerizable olefin is 1-octene or a mixture of ethylene and 1-hexene, the method further comprising replicating the contacting step in at least 1 additional polymerization run under identical polymerization conditions and with identical polymerizable olefin(s) and determining a catalyst productivity value for each polymerization run. Identical polymerizable olefin(s) means same composition and amount(s) relative to the amount of metal of the molecular catalyst.

Method of preparing a molecular catalyst. The method may use the catalyst productivity values to screen molecular catalysts to determine which of the molecular catalysts prepared by the method is a better catalyst and determine optimal loading of a particular molecular procatalyst prepared by the method for use in a specific polymerization reaction.

The method comprises the mixing step. The mixing step is carried out under activating conditions. Suitable conditions may comprise an inert gas atmosphere (e.g., molecular nitrogen, argon, or helium gas), pressure from 90 kilopascals (kPa) to 120 kPa, and a temperature from 0 degrees Celsius (° C.) to 100° C.

In the method the mixing step includes reacting the molecular procatalyst with the sdAAO/HFS so as to activate the molecular procatalyst and produce the catalyst system. In some aspects the molecular catalyst is a product of a reaction of the alkylaluminoxane of the sdAAO/HFS and the molecular procatalyst. In other aspects the molecular catalyst is a product of a reaction of the sdAAO/HFS and the molecular procatalyst.

In the method the mixing step may further comprise additional activators for activating the molecular procatalyst in addition to the sdAAO/HFS. Examples of additional activators include an organoborate or organoboron.

In the method the mixing step may be free of a neutral aromatic hydrocarbon or a ($C_8$)alkane or larger alkane (e.g., a ($C_{10}$)alkane or ($C_{20}$)alkane). As used herein, "neutral aromatic hydrocarbon" means a carbocyclic molecule that is or contains a planar unsaturated ring of delocalized pi-bonds, such as benzene, toluene, and naphthalene. The mixing step may contain an anionic aromatic hydrocarbon such as a cyclopentadienyl anion.

The method produces the catalyst system. The catalyst system comprises the molecular catalyst. The catalyst system is formed in the ($C_5$-$C_7$)alkane. The catalyst system may further comprise an activation reaction by-product. The by-product may comprise hydrophobic fumed silica or an aluminum-containing by-product disposed on the hydrophobic fumed silica. In some aspects the molecular catalyst may be soluble, alternatively partially soluble, alternatively insoluble in the ($C_5$-$C_7$)alkane. The molecular catalyst may be separated from the by-product by any suitable means such as filtration or decantation. The ($C_5$-$C_7$)alkane may be removed from the molecular catalyst by any suitable means such as evaporation or drying under vacuum at room temperature or elevated temperature (e.g., up to 50° C.). The catalyst system may be free of the ($C_5$-$C_7$)alkane, a neutral aromatic hydrocarbon, a ($C_8$)alkane or larger alkane, or a combination of any two or more thereof. The catalyst system may contain an anionic aromatic hydrocarbon such as a cyclopentadienyl anion.

The method uses certain reactants (molecular procatalyst and sdAAO/HFS, and optionally the additional activator) and other materials (e.g., the ($C_5$-$C_7$)alkane)) and produces certain products and optionally by-products in the catalyst system (e.g., molecular catalyst and optionally the above-mentioned by-products). These materials may be further described below.

($C_5$-$C_7$)alkane. The ($C_5$-$C_7$)alkane may be a ($C_5$)alkane, a ($C_6$)alkane, a ($C_7$)alkane, or a mixture of any two or more thereof. In some aspects the ($C_5$-$C_7$)alkane is a ($C_5$)alkane or a ($C_6$)alkane. The ($C_5$-$C_7$)alkane may be a ($C_5$)alkane and the ($C_5$)alkane may be pentane (i.e., $CH_3(CH_2)_3CH_3$), 2-methylbutane, or 2,2-dimthylpropane. The ($C_5$-$C_7$)alkane may be a ($C_6$)alkane and the ($C_6$)alkane may be hexane (i.e., $CH_3(CH_2)_4CH_3$); 2-methylpentane; 3-methylpentane; 2,2-dimethylbutane; or 2,3-dimethylbutane. The ($C_5$-$C_7$)alkane may be a ($C_7$)alkane and the ($C_7$)alkane may be heptane (i.e., $CH_3(CH_2)_5CH_3$); 2-methylhexane; 3-methylhexane; 2,2-dimethylpentane; 2,3-dimethylpentane; 3,3-dimethylpentane; or 2,4-dimethylpentane. In some aspects the ($C_5$-$C_7$)alkane is pentane, hexane, heptane, or a mixture of any two thereof. In some aspects the ($C_5$-$C_7$)alkane is hexane, alternatively a mixture of hexane and pentane (i.e., a mixture of $CH_3(CH_2)_4CH_3$ and $CH_3(CH_2)_3CH_3$). If desired, prior to contacting the ($C_5$-$C_7$)alkane with the molecular procatalyst and sdAAO/HFS, the ($C_5$-$C_7$)alkane may be dried (to remove any water) and/or deoxygenated (e.g., to remove any molecular oxygen) by passing the ($C_5$-$C_7$)alkane through a 3-Angstroms molecular sieve column and/or purging the (resulting eluted) ($C_5$-$C_7$)alkane with molecular nitrogen to give dried and/or deoxygenated ($C_5$-$C_7$)alkane.

Spray-dried alkylaluminoxane on hydrophobic fumed silica (sdAAO/HFS). Preparation of spray-dried alkylaluminoxane on hydrophobic fumed silica may be illustrated by this example. Prepare a toluene solution of alkylaluminoxane (AAO) by adding to a 270 gallon feed tank: 718 pounds of dry, degassed toluene, 493 pounds of 10 wt % AAO in toluene, and 67 pounds of CAB-O-SIL TS-610 treated silica. Stir the resulting contents overnight at approximately 38° C. to give a mixture. Feed the mixture at a feed rate of 165 pounds per hour to an atomizing device comprising an inlet and an outlet in fluid communication with the inlet and a condenser in fluid communication with the outlet. Maintain atomizer speed at 90% and outlet temperature at the condenser at about 90° C. so as to produce droplets from the atomizer. Contact droplets with a gas stream (e.g., nitrogen gas stream) to evaporate volatiles (liquid), thereby forming sdAAO/HFS as a particulate solid (powder). In an embodiment the sdAAO/HFS particles has an aluminum loading of 6 to 7 millimoles (mmol) Al per gram of particles (mmol/g); and a particle size distribution as follows: median particle size, D50, of 20 micrometers, 10% particle size, D10, of 12 micrometers, and 90% particle size, D90, of 31.8 micrometers. D10 is the diameter at which 10% of a sample's volume is comprised of particles less than the D10 diameter. D50 is the diameter at which 50% of a sample's volume is comprised of particles less than the D50 diameter and 50% greater than the D50 diameter. D90 is the diameter at which 90% of a sample's volume is comprised of particles less than the D90 diameter. Alternatively, the sdAAO/HFS may be prepared by a manner as illustrated later for the preparation of spray-dried methylaluminoxane on hydrophobic fumed silica. In some aspects D50 is 20.000 micrometers.

The spray-dried AAO is believed to be advantageously physisorbed on the hydrophobic fumed silica of the sdAAO/HFS. In contrast, spray-drying AAO on an untreated fumed silica, with its surface silicon-bonded hydroxyl groups, would give a non-inventive spray-dried AAO on untreated fumed silica (sdAAO/UFS) that is chemisorbed thereon.

The alkylaluminoxane used to prepare the sdAAO/HFS may be a polymeric form of a ($C_1$-$C_{10}$)alkylaluminoxane or a polymethylaluminoxane (PMAO). The PMAO may be a polymethylaluminoxane-Improved Performance (PMAO-IP), which is commercially available from AkzoNobel. The ($C_1$-$C_{10}$)alkylaluminoxane may be methylaluminoxane (MAO), a modified methylaluminoxane (MMAO) such as modified methylaluminoxane, type 3A (MMAO-3A), type 7 (MMAO-7), or type 12 (MMAO-12), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, or 1-methylcyclopentylaluminoxane. The arylaluminoxane may be a ($C_6$-$C_{10}$)arylaluminoxane, which may be phenylaluminoxane, 2,6-dimethylphenylaluminoxane, or naphthylaluminoxane. The aralkylaluminoxane may be benzylaluminoxane or phenethylaluminoxane. Typically, the compound (A) is MAO, MMAO, PMAO, or PMAO-IP. The hydrocarbylaluminoxane may be made by a non-hydrolytic process using, or by partial hydrolysis of, trihydrocarbylaluminum compounds according to well-known methods or may be obtained from a commercial source. E.g., methylaluminoxane. Commercially available, e.g., from Albemarle Corporation, Baton Rouge, La., USA.

Hydrophobic fumed silica. The hydrophobic fumed silica may be a product of treating untreated fumed silica with the treating effective amount of a treating agent reactive with silicon-bonded hydroxyl groups (SiOH groups). The treating agent reactive with silicon-bonded hydroxyl groups may be hexamethyldisilazane (i.e., $(CH_3)_3SiNHSi(CH_3)_3$); alternatively a combination of hexamethyldisilazane and octamethylcyclotetrasilazane (i.e., cyclic $[—Si(CH_3)_2N—]_4$); alternatively a combination of hexamethyldisilazane in a bis[trimethylsilyl-endcapped] polydimethylsiloxane liquid (e.g., $(CH_3)_3SiO—[(CH_3)_2SiO_{2/2}]_nOSi(CH_3)_3$, wherein subscript n is an integer from 10 to 100); alternatively octyltrimethoxysilane (i.e., $CH_3(CH_2)_7Si(OCH_3)_3$); alternatively octyltriethoxysilane (i.e., $CH_3(CH_2)_7Si(OCH_2CH_3)_3$); alternatively dimethyldichlorosilane (i.e., $(CH_3)_2SiCl_2$); alternatively octylsilane (i.e., $CH_3(CH_2)_7SiH_3$). Suitable hydrophobic fumed silicas are commercially available, e.g., from Cabot Corporation, Boston, Mass., USA. The treating effective amount is a quantity of the treating agent sufficient to react with or "cap" substantially all or all of the surface-bound silicon-bonded hydroxyl groups of the untreated fumed silica.

Molecular procatalyst. A molecular procatalyst may be referred to as a molecular catalyst precursor or molecular precatalyst. The molecular procatalyst is generally a metal complex with a well-defined structure and little or no catalytic function (e.g., catalyst efficiency may be 0 or <1,000). The molecular procatalyst generally, upon activation with an activator (sometimes called a co-catalyst) yields a discrete homogeneous single catalytic site compound or a discrete multi-(catalytic site) compound that is effective for polymerizing ethylene and alpha-olefins. The molecular procatalyst may be a ligand-metal complex. The ligand-metal complex may be (i) a cyclopentadienyl ligand-metal complex procatalyst; (ii) a cyclopentadienyl-free ligand-metal complex procatalyst; or (iii) a combination of (i) and (ii). The cyclopentadienyl ligand-metal procatalyst is useful for preparing so-called metallocene catalysts. The cyclopentadienyl-free ligand-metal complex procatalyst, which is useful for preparing so-called post-metallocene catalysts, includes constrained geometry catalysts. Examples of suitable cyclopentadienyl-free ligand-metal complex procatalysts are a phenoxy-imine ligand-early transition metal complex procatalyst (FI procatalyst), a pyrrolide-imine ligand-Group 4 transition metal complex procatalyst (PI procatalyst), an indolide-imine ligand-Ti complex (II procatalyst), an phenoxy-imine ligand-Group 4 transition metal complex procatalyst (IF procatalyst), an phenoxy-ether ligand-Ti complex procatalyst (FE procatalyst), an imine-pyridine ligand-late transition metal complex procatalyst (IP procatalyst), and an tris(pyrazolyl) borate ligand-Ta complex procatalyst (PB procatalyst).

Examples of suitable molecular ligand-metal complex procatalysts are (TTSi)CpTiCl$_2$, wherein (TTSi)Cp is 1,2,3, 4-tetramethyl-5-(trimethylamino(dimethyl)silyl) cyclopentadienyl; and the molecular ligand-metal complex procatalysts described in any one of: U.S. Pat. No. 6,827,976; US 2004/0010103 A1; U.S. Pat. No. 8,058,373 B2, at column 11, line 35, to column 16, line 3; complexes of formula (I) described in WO 2016/003878 A1; the fused ring substituted indenyl metal complexes described in U.S. Pat. No. 6,034, 022; the constrained geometry metal procatalysts referenced in the Background of U.S. Pat. No. 6,034,022; the ligand-metal complexes described in U.S. 62/234,910 filed Sep. 30, 2015; the ligand-metal complexes described in U.S. 62/234, 791 filed Sep. 30, 2015; and bis((2-oxoyl-3-(3,5-bis-(1,1-dimethylethyl)phenyl)-5-(methyl)phenyl)-(5-2-methyl)propane-2-yl)2-phenoxy)-1,3-propanediyl zirconium (IV) dimethyl, which is disclosed in WO 2007/136494.

Molecular catalyst. The molecular catalyst consists essentially of a product of an activation reaction of the molecular procatalyst with the sdAAO/HFS, especially with the alkylaluminoxane portion of the sdAAO/HFS. The molecular catalyst may be unsupported or supported. The support of the supported molecular catalyst may be the hydrophobic silica. Molecular catalysts for olefin polymerizations are generally well-known in the art. Molecular catalyst is generally a metal complex with a well-defined structure. The molecular catalyst generally may be a homogeneous single site catalyst that is effective for polymerizing ethylene and alpha-olefins. The molecular catalyst generally may exhibit single-site or multi-site behaviors under polymerization conditions. The unsupported molecular catalyst is a molecular catalyst that is not disposed or deposited on a solid support, but is dissolved in a solvent such as a polymerizable olefin, a saturated or aromatic hydrocarbon liquid, or a mixture of any two or more thereof. The molecular catalyst is distinct from a Ziegler-Natta catalyst in solubility, structure, and composition. The molecular catalyst may be soluble in a saturated or aromatic hydrocarbon liquid or insoluble therein. The molecular catalyst may be selected from any molecular ligand-transition metal complex catalyst that catalyzes polymerizing olefins in which the transition metal is a Group 3 to 11 element of the Periodic Table of Elements, including the lanthanides and actinides. In some aspects the transition metal is Ti, Zr, Hf, V, or Cr. In some aspects the transition metal is selected from the group of any four of Ti, Zr, Hf, V, and Cr. In some aspects the transition metal is Fe, Co, Ni, or Pd. In some aspects the transition metal is selected from the group of any three of Fe, Co, Ni, and Pd. In some aspects the molecular catalyst is a transition metal complex that can polymerize olefins in solution under high temperature solution process conditions. In some aspects the molecular catalyst may be selected from any one or more of bis-phenylphenoxy catalysts, constrained geometry catalysts, imino-amido type catalysts, pyridyl-amide catalysts, imino-enamido catalysts, aminotroponiminato catalysts, amidoquinoline catalysts, bis(phenoxy-imine) catalysts, phosphinimide catalysts, and metallocene catalysts.

The optional additional activator may be the organoborate or the organoboron. The organoborate may be a fluoroorganoborate compound, e.g., a (per)fluorodiaryl borate, such as N,N-dimethylanilinium tetrakis(pentafluorophenyl)borate, triphenylcarbenium tetrakis(pentafluorophenyl)borate, N,N-dimethylanilinium tetrakis[3,5-bis(trifluoromethyl)phenyl]borate, or triphenylcarbenium tetrakis[3,5-bis(trifluoromethyl)phenyl]borate, or a mixture of any two or more thereof. For example, the organoborate may be a methyldi$((C_{14}-C_{18})$alkyl)ammonium salt of tetrakis(pentafluorophenyl)borate, which may be prepared by reaction of a long chain trialkylamine (Armeen™ M2HT, available from Akzo-Nobel, Inc.), HCl and Li[B(C$_6$F$_5$)$_4$]. Such a preparation is disclosed in U.S. Pat. No. 5,919,983, Ex. 2. Or the borate is purchased from Boulder Scientific. The organoborate may be used herein without (further) purification. The organoboron may be a fluoroorganoboron compound. For example, the organoboron may be a tris(perfluoroaryl)borane such as tris(pentafluorophenyl)borane, tris[3,5-bis(trifluoromethyl)phenyl]boron, or a mixture of any two or more thereof.

Polymerizable olefins. Examples of suitable polymerizable olefins include ethylene ($CH_2CH_2$) and ($C_3$-$C_{40}$)alpha-olefins. The polymerizable olefin may comprise a mixture of ethylene and a ($C_3$-$C_{40}$)alpha-olefin. The ($C_3$-$C_{40}$)alpha-olefin may be from 0.1 wt % to 20 wt %, alternatively from 0.1 to 15 wt %, alternatively 0.1 to 10 wt %, alternatively 0.1 to 5 wt % of the mixture and ethylene the remainder. The ($C_3$-$C_{40}$)alpha-olefin may be a ($C_3$-$C_{20}$)alpha-olefin, alternatively a ($C_3$-$C_{12}$)alpha-olefin, alternatively a ($C_3$-$C_8$)alpha-olefin. Examples of the ($C_3$-$C_8$)alpha-olefin are propene, 1-butene, 1-hexene, and 1-octene. The molecular catalyst may be used to polymerize ethylene to give a polyethylene. Alternatively, the molecular catalyst may be used to polymerize a ($C_3$-$C_{40}$)alpha-olefin to give a poly(($C_3$-$C_{40}$)alpha-olefin) polymer. Alternatively, the molecular catalyst may be used to copolymerize ethylene and at least one ($C_3$-$C_{40}$)alpha-olefin to give a poly(ethylene-co-($C_3$-$C_{40}$)alpha-olefin) copolymer. In some aspects: (i) the at least one polymerizable olefin is ethylene and the polyolefin product comprises a polyethylene; (ii) the at least one polymerizable olefin is at least one ($C_3$-$C_{40}$)alpha-olefin and the polyolefin product comprises a poly(($C_3$-$C_{40}$)alpha-olefin); or (iii) the at least one polymerizable olefin is a combination of ethylene and at least one ($C_3$-$C_{40}$)alpha-olefin and the polyolefin product comprises a poly(ethylene-co-($C_3$-$C_{40}$)alpha-olefin) copolymer.

Method of polymerizing an olefin. The method of polymerizing an olefin may be carried out in a polymerization reaction mixture containing at least one polymerizable olefin and the molecular catalyst. The polymerization reaction mixture may contain an additional amount of a saturated or aromatic hydrocarbon liquid as a diluent or solvent so as to avoid oversaturating the mixture with polymer product, and thereby reducing catalyst efficiency. In some aspects the amount of polymer product in the polymerization reaction mixture is less than or equal to 30 wt %. Polymerizations may be done in any suitable rector such as a batch reactor or in a continuous reactor such as a continuous solution polymerization reactor. The polymerization reaction mixture may be agitated (e.g., stirred) and the temperature of the polymerization reaction mixture may be controlled by removing heat of reaction therefrom so as to optimize the polymerization. In the method of polymerizing an olefin the molecular catalyst is used in a catalytically effective amount, such as from 0.0001 to 0.1 milligram-atoms of metal of the molecular catalyst per liter (L) of the polymerization reaction mixture. The method of polymerizing an olefin may be a batch method, semi-continuous method, or a continuous method. The continuous method continuously supplies reactants to the reactor and removes polymer product from the reactor. The semi-continuous method periodically adds reactants to the reactor and periodically removes polymer product from the reactor. The batch method adds reactants to the reactor and then removes polymer product from the reactor after the polymerization reaction is finished.

An example of a method of polymerizing uses a stirred-tank reactor, into which the polymerizable olefin(s) are introduced continuously together with any additional amount of saturated or aromatic hydrocarbon liquid. The reactor contains a liquid phase composed substantially of ethylene, and optionally a ($C_3$-$C_{40}$)alpha-olefin, saturated or aromatic hydrocarbon liquid and dissolved polymer product. The molecular catalyst and/or their procatalysts and sdAAO/HFS are continuously or intermittently introduced into the reactor liquid phase, or any recycled portion thereof. The reactor temperature and pressure may be controlled by adjusting the solvent/olefin ratio, the catalyst addition rate, as well as by cooling or heating coils, jackets or both. The extent of the polymerization reaction may be controlled by the rate of catalyst(s) addition. The ethylene content of the polymer product is determined by the ratio of ethylene to ($C_3$-$C_{40}$)alpha-olefin, if any, in the reactor, which is controlled by manipulating the respective feed rates of the components to the reactor. The polymer product's molecular weight is controlled, optionally, by controlling other polymerization variables such as the temperature, olefin concentration(s), or by feeding molecular hydrogen at a controlled rate into the reactor. If used, the molecular hydrogen may have a concentration of 0.001 to 1 mole percent per 1 mole of ethylene. Upon exiting the reactor, the effluent containing product polymer may be contacted with a catalyst kill agent such as water, steam or an alcohol. The product polymer mixture is optionally heated, and the polymer product recovered by flashing off gaseous or vaporous components such as ethylene, alpha olefin, and hydrocarbon liquid, optionally under reduced pressure. If desired, further devolatilization may be done in a devolatilizing extruder. In the continuous process the mean residence time of the molecular catalyst and product polymer in the reactor generally is 1 minute to 8 hours, and alternatively 5 minutes to 6 hours. Alternatively, a continuous loop reactor such as in U.S. Pat. Nos. 5,977,251; 6,319,989; or U.S. Pat. No. 6,683,149 and ad rem conditions may be used instead of the stirred tank reactor. In some aspects the method of polymerizing an olefin is a solution phase process, alternatively a slurry phase process, alternatively a gas phase process.

Polyolefin product made by the method of polymerizing an olefin. The polyolefin product comprises a polyolefin composition comprising polyolefin macromolecules. The polyolefin product may be a polymer or copolymer. The polymer may be a homopolymer such as polyethylene or poly(($C_3$-$C_{40}$)alpha-olefin) homopolymer such as polypropylene homopolymer. The copolymer may be a poly(ethylene-co-($C_3$-$C_{40}$)alpha-olefin) copolymer such as a poly(ethylene-co-propene) copolymer, a poly(ethylene-co-1-butene) copolymer, a poly(ethylene-co-1-hexene) copolymer, or a poly(ethylene-co-1-octene) copolymer. The polyethylene may be a high density polyethylene (HDPE), linear low density polyethylene (LLDPE), medium density polyethylene (MDPE), a very low density polyethylene (VLDPE), a high melt strength high density polyethylene (HMS-HDPE), or a combination of any two or more thereof.

The polyolefin polymer or copolymer may further include one or more additives such as antistatic agents, color enhancers, dyes, lubricants, fillers, pigments, primary antioxidants, secondary antioxidants, processing aids, and ultraviolet (UV) light stabilizers. The resulting additive containing polyolefin (co)polymer may comprise from 0 wt % to 10 wt % of each additive, based on the weight of the additive containing polyolefin (co)polymer. Antioxidants, such as Irgafos™ 168 and Irganox™ 1010, may be used to protect the polyolefin (co)polymer from thermal and/or oxidative degradation. Irganox™ 1010 is tetrakis (methylene (3,5-di-tert-butyl-4hydroxyhydrocinnamate) available from Ciba Geigy Inc. Irgafos™ 168 is tris (2,4 di-tert-butylphenyl) phosphite available from Ciba Geigy Inc.

The polyolefin product may be used in a forming operation to prepare manufactured articles from or comprising the polyolefin product. Examples of such forming operations are film forming, sheet forming, pipe forming, fiber extruding, fiber co-extruding, blow molding, injection molding, and rotary molding. The manufactured articles prepared thereby may be blown or cast films, such as films formed by co-extrusion or lamination; fibers such as melt spun fibers and melt blown fibers for use in non-woven and woven fabrics; extruded articles; and molded articles. The films may be made as shrink films, cling films, stretch films, sealing films, oriented films, snack packaging films, heavy duty bags, grocery sacks, baked and frozen food packaging, medical packaging, industrial liners, agricultural films, and membranes such as food-contact and non-food-contact membranes. The fibers may be made for use in diaper fabrics, medical garments, and geotextiles. The extruded articles may be made as medical tubing, wire and cable coatings, geomembranes, and pond liners. The molded articles may be made as bottles, tanks, large hollow articles, rigid food containers, and toys.

Any compound herein includes all its isotopic forms, including natural abundance forms and/or isotopically-enriched forms. The isotopically-enriched forms may have additional uses, such as medical or anti-counterfeiting applications, wherein detection of the isotopically-enriched form is helpful in treatment or investigation.

The following apply unless indicated otherwise. Alternatively precedes a distinct embodiment. ASTM means the standards organization, ASTM International, West Conshohocken, Pa., USA. IEC means the standards organization, International Electrotechnical Commission, Geneva, Switzerland. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, N.C., USA). May confers a permitted choice, not an imperative. Operative means functionally capable or effective. Optional (ly) means is absent (or excluded), alternatively is present (or included). PPM is weight based. Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature is 23° C.±1° C. Substituted when referring to a compound means having, in place of hydrogen, one or more substituents, up to and including per substitution.

Advantageously we discovered that the inventive method is useful in preparing molecular catalysts having less variability in catalyst productivity values from polymerization run to polymerization run under identical polymerization conditions and with identical polymerizable olefin(s), thereby allowing the method to be used to screen molecular catalysts to determine which of the molecular catalysts prepared by the method is a better catalyst and determine optimal loading of a particular molecular procatalyst prepared by the method for use in a specific polymerization reaction. The molecular catalysts prepared by the method may be used to catalyze polymerization reactions such as polymerization of one or more olefin monomer(s) to give polyolefin products. The olefin monomer(s) include ethylene and alpha-olefins. The polyolefin products include homopolymers such as polyethylene and polypropylene as well as copolymers such as poly(ethylene-co-(alpha-olefin)) copolymers, including poly(ethylene-co-(alpha-olefin)) block copolymers. The polyolefin products may be used in a wide variety of articles and applications including, but not limited to, as a component of a coating of a coated conductor such as a coated wire or coated cable.

EXAMPLES

Toluene: purified (deoxygenated and dried) to remove impurities such as molecular oxygen and moisture by passing the toluene through a 3-Angstroms molecular sieve column and purging the resulting eluted toluene with molecular nitrogen to give purified toluene. Typical water content of purified toluene was less than 40 parts per million (ppm) based on total weight. Hexane and pentane may be purified in a similar manner.

Hydrophobic Fumed Silica 1: a low surface area fumed silica that has been surface modified with dimethyldichlorosilane. Obtained from Cabot Corporation as CAB-O-SIL TS-610.

Methylaluminoxane (MAO): obtained from Albemarle in a 250 gallon cylinder as a solution of 10 wt % MAO in toluene.

Molecular procatalyst 1: 2,2'-bis[(2,3,4,5,6-pentamethylphenylamino)ethyl]amine dibenylzirconium. Has the formula (1) below:

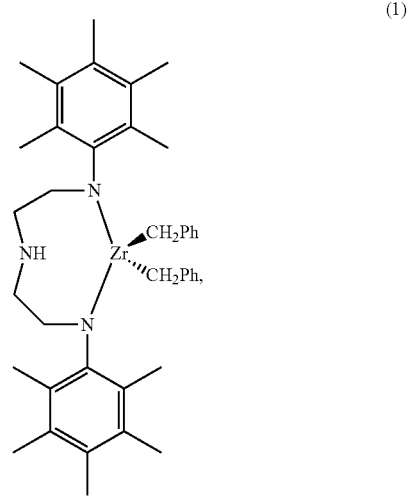

wherein "—" on phenyl groups indicate methyl substituents and Ph denotes a phenyl group. May be prepared from 2 mole equivalents of pentamethylbromobenzene and diethylenetriamine in the presence of a palladium complex according to the method of U.S. Pat. No. 8,501,659 B2.

Molecular procatalyst 2: (1,2,3,4-tetramethylcyclopentadienyl)-(propylcyclopentadienyl)zirconium dichloride. Has the formula (2) below:

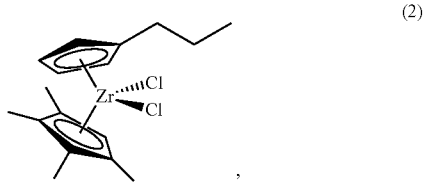

wherein "—" on cyclopentadienyl group indicates methyl substituents and "N" denotes a propyl group. May be prepared from pentamethylcyclopentadienyl zirconium trichloride and sodium normal-propylcyclopentadienide according to the method of Example 1 of US 2005/0032992 A1.

Spray-dried methylaluminoxane on hydrophobic fumed silica 1 (sdMAO/HFS-1). First prepared a feed stock slurry in a 10 gallon feed tank by first adding about 37 pounds of toluene and 25.5 pounds of MAO, then added to the tank 3.5 pounds of Hydrophobic Fumed Silica 1. The resulting mixture is stirred for an hour at about 38° to 40° C. The resulting feed stock slurry is then introduced through a rotary wheel into a spray drying chamber using spray drying process conditions of 90% atomizer speed, 165° C. inlet temperature, and 80° C. outlet temperature. The rotary wheel dispersed the slurry into a controlled drop size spray of droplets of sdMAO/HFS-1 and toluene. The spray is contacted with a stream of heated nitrogen gas at 165° C. to evaporate the toluene from the droplets and give approximately 6 pounds of sdMAO/HFS-1, of which the last four pounds produced are separately recovered for use so as not to be contaminated by any previous preparation made in the spray drier.

All chemistry procedures described below were done under inert atmosphere using a glove box or Schlenk line techniques.

Comparative Example 1 (CE1): preparation of comparative molecular catalyst 1. Used conventional spray drying. Spray dry at 80 C. a homogeneous mixture of molecular procatalyst 1, methylaluminoxane, Hydrophobic Fumed Silica 1, and toluene in a laboratory scale Buchi rotary evaporator to give about 5 grams (g) of powdered comparative molecular catalyst 1. Loading of zirconium ("[Zr]") was 50 micromoles (pmol) per g of catalyst and aluminum loading ("[Al]") was 6 millimoles (mmol) per gram catalyst.

Comparative Example 2 (CE2): preparation of comparative molecular catalyst 2 in hexane. Replicate the procedure of CE1 except use molecular procatalyst 2 instead of molecular procatalyst 1 to give about 5 g of powdered comparative molecular catalyst 2. [Zr] loading of 50 μmol/g of catalyst and [Al] loading of 6 mmol/g catalyst. Mix 0.2 g of catalyst 2 and 20 milliliters (mL) of hexane in a glass vial to give comparative catalyst system 2 having [Zr] of 0.5 μmol/mL.

Comparative Example 3 (CE3): preparation of comparative molecular catalyst 3 in mineral oil. To a 20 mL volume glass vial, added 0.020 g of molecular procatalyst 2, 10 mL of hydrobrite 380 mineral oil, and 1.0 g of the sdMAO/HFS-1, and mixed the vial contents well to give a catalyst system 3 of comparative molecular catalyst 3 in mineral oil. [Zr] loading of 4.84 μmol/g of catalyst and solids content of 96.4 mg solids/g catalyst system 3.

Inventive Example 1 (IE1): preparation of inventive molecular catalyst 1. Added 0.033 g of molecular procatalyst 1 into a 20 mL volume glass vial, added 3 mL hexane, mixed the resulting contents to achieve good dispersion. To the mixture added 0.5 g of sdMAO/HFS-1, sealed the vial, and mixed the contents on a roller for several hours. Removed hexane under vacuum at room temperature to give inventive molecular catalyst 1 as a dry, free-flowing powder that preserved the particle morphology of the sdMAO/HFS-1. Inventive molecular catalyst 1 had [Zr] 50 μmol/g of catalyst and [Al] loading of 6 mmol/g catalyst.

Inventive Example 2 (IE2): preparation of inventive molecular catalyst 2. Added 0.020 g of molecular procatalyst 2 into a 20 mL volume glass vial, added 10 mL of pentane and 1 g of sdMAO/HFS-1, and mixed the contents to achieve good dispersion to give inventive molecular catalyst 2; [Zr] 50 μmol/g of catalyst and [Al] loading of 6 mmol/g catalyst. Withdraw 2 mL of the resulting mixture, and added it along with 18 mL of hexane to a second 20 mL volume glass vial to give inventive molecular catalyst system 2 having [Zr] of 0.5 μmol/mL.

Inventive Example 3 (IE3): preparation of inventive molecular catalyst 3. Added 0.020 g of molecular procatalyst 2 into a 20 mL volume glass vial. Added 10 mL of hexane and 1.0 g of sdMAO/HFS-1, and mixed well to achieve good dispersion of inventive molecular catalyst 3 in catalyst system 3. Catalyst system 3 had [Zr] 4.68 μmol/g of catalyst and solids content of 93.3 mg solids/mL catalyst system 3.

Comparative and Inventive Polymerization Examples 1 (CPE1 and IPE1): in separate runs in a laboratory scale, gas phase, stirred bed autoclave under identical olefin polymerization conditions comprising a 2 liter stirred bed autoclave charged with 300 g of NaCl, 225 psi (1550 kilopascals (kPa)) of ethylene, hydrogen/ethylene mole ratio of 0.0017/1.0000, a 1-hexene/ethylene mole ratio of 0.004/1.000 and controlled at a setpoint temperature of 100° C. A nominal catalyst charge of 15 mg is injected into the reactor. As polymerization proceeds, ethylene, 1-hexene, and hydrogen are added to maintain the reactor composition, the temperature is controlled at 100° C., the polymerization is run for one hour at which time the reactor is vented and the polymerization stops. Use comparative molecular catalyst 1 of CE1 or inventive molecular catalyst 1 of IE1, respectively, to polymerize a mixture of ethylene and 1-hexene (ethylene in the reactor is at 225 psi (1550 kPa) partial pressure and the mole ratio of 1-hexene to ethylene is 0.004/1.000) to give a poly(ethylene-co-1-hexene) copolymer. Replicate the run of CPE1 8 more times and replicated the run of IPE11 more time. Measure catalyst productivity in grams of copolymer produced per ghr for each run, wherein ghr is grams of polymer produced per gram of catalyst used per hour of polymerization time. The range of catalyst productivity values are shown later in Table 1.

Comparative and Inventive Polymerization Examples 2 (CPE2 and IPE2): in separate runs in a vial scale, semi-adiabatic solution phase vial under identical olefin polymerization conditions comprising in a 40 mL glass vial, a small stir bar, 11 mL of 1-octene and 4 mL of either the IE catalyst or the CE catalyst were added. The vial was inserted into an insulated sleeve mounted on a magnetic stirrer, the vial was sealed with a septum cap, a thermocouple inserted through the cap to below the liquid level and the temperature was measured as a function of time. Use comparative molecular catalyst system 2 of CE2 or inventive molecular catalyst system 2 of 1E2, respectively, to polymerize 1-octene (11 mL at 25° C.) to give a poly(l-octene) homopolymer. Replicate each run at least 3 more times. Chart thermokinetic profiles of the runs as a plot of reaction temperature on y-axis and run time on x-axis. The thermokinetic profiles were substantially similar for CPE2 and IPE2.

Comparative and Inventive Polymerization Examples 3 (CPE3 and IPE3): in separate runs in a laboratory scale, gas phase, stirred bed autoclave under identical olefin polymerization conditions comprising a 2 liter stirred bed autoclave charged with 300 g of NaCl, 225 psi (1550 kPa) of ethylene, hydrogen/ethylene mole ratio of 0.0017/1.000, a 1-hexene/ethylene mole ratio of 0.004/1.000 and controlled at a setpoint temperature of 100° C. A nominal catalyst charge of 15 mg is injected into the reactor. As polymerization proceeds, ethylene, 1-hexene, and hydrogen are added to maintain the reactor composition, the temperature is controlled at 100° C., the polymerization is run for one hour at which time the reactor is vented and the polymerization stops. Use comparative molecular catalyst system 3 of CE3 or inventive molecular catalyst system 3 of 1E3, respectively, to polymerize a mixture of ethylene and 1-hexene (ethylene in the reactor is at 225 psi (1550 kPa) partial pressure and the mole ratio of 1-hexene to ethylene is 0.004/1.000) to give a poly(ethylene-co-1-hexene) copolymer. Replicate each 3 more times. Measure catalyst productivity in grams of copolymer produced per ghr. The range of catalyst productivity values are shown below in Table 1.

TABLE 1

| | Range of catalyst productivity values.. | | | |
|---|---|---|---|---|
| | Ex. No. | | | |
| | CPE1 | IPE1 | CPE3 | IPE3 |
| Number of Runs | 9 | 2 | 4 | 4 |
| Catalyst Productivity Range (g/ghr) | 4,100 to 5,900 | 3,700 to 4,500 | 6,400 to 8,600 | 8,700 to 9,800 |

As shown by the data in Table 1 and CPE2 and IPE2, the inventive method is useful in preparing molecular catalysts having less variability in catalyst productivity values from polymerization run to polymerization run under identical polymerization conditions and with identical polymerizable olefin(s), thereby allowing the method to be used to screen molecular catalysts to determine which of the molecular catalysts prepared by the method is a better catalyst and determine optimal loading of a particular molecular procatalyst prepared by the method for use in a specific polymerization reaction.

Incorporate by reference here the below claims as numbered aspects except replace "claim" and "claims" by "aspect" or "aspects," respectively.

The invention claimed is:

1. A method of preparing a molecular catalyst, the method comprising mixing under activating conditions a molecular procatalyst, a spray-dried alkylaluminoxane on hydrophobic fumed silica (sdAAO/HFS), and a $(C_5\text{-}C_7)$alkane to give a catalyst system comprising a molecular catalyst in the $(C_5\text{-}C_7)$alkane; and replacing the $(C_5\text{-}C_7)$alkane of a mixture of a molecular catalyst and the $(C_5\text{-}C_7)$alkane with a mineral oil to give a mixture of the molecular catalyst and the mineral oil that is free of the $(C_5\text{-}C_7)$alkane.

2. The method of claim 1 wherein the $(C_5\text{-}C_7)$alkane is a $(C_5)$alkane, a $(C_6)$alkane, or a mixture of a $(C_5)$alkane and a $(C_6)$alkane.

3. The method of claim 1 wherein the $(C_5\text{-}C_7)$alkane is hexane, pentane, or a mixture of hexane and pentane.

4. The method of claim 1 wherein (i) the alkylaluminoxane is methylaluminoxane (MAO); (ii) the hydrophobic fumed silica is a treated fumed silica prepared by treating an untreated fumed silica with a treating effective amount of a treating agent reactive with silicon-bonded hydroxyl groups; or (iii) both (i) and (ii).

5. The method of claim 4 wherein the treating agent reactive with silicon-bonded hydroxyl groups is hexamethyldisilazane; a cyclic silazane; a combination of hexamethyldisilazane and a cyclic silazane; a combination of hexamethyldisilazane in a silicone oil; a $(C_5\text{-}C_{10})$alkyltrialkoxysilane; an alkylchlorosilane of formula $R_xSiCl_{(4-x)}$, wherein subscript x is an integer of 0, 1, 2, or 3; and each R is independently a $(C_1\text{-}C_{10})$alkyl; an alkylhydridosilane of formula $R_ySiH_{(4-y)}$, wherein subscript y is an integer of 0, 1, 2, or 3; and each R is independently a $(C_1\text{-}C_{10})$alkyl; or a combination of any two or more thereof.

6. The method of claim 5 wherein the treating agent reactive with silicon-bonded hydroxyl groups is hexamethyldisilazane; a combination of hexamethyldisilazane and octamethylcyclotetrasilazane; a combination of hexamethyldisilazane in a bis[trimethylsilyl-endcapped] polydimethylsiloxane liquid; octyltrimethoxysilane; octyltriethoxysilane; dimethyldichlorosilane; or octylsilane.

7. The method of claim 1 wherein the molecular procatalyst is a (i) a cyclopentadienyl ligand-metal complex procatalyst or (ii) a cyclopentadienyl-free ligand-metal complex procatalyst; and the molecular catalyst is a product of an activation reaction of (i) or (ii) with the sdAAO/HFS.

8. The method of claim 1 further comprising contacting a catalytic amount of the molecular catalyst with at least one polymerizable olefin under polymerization conditions to give a polyolefin product.

9. The method of claim 8 wherein the at least one polymerizable olefin is 1-octene or a mixture of ethylene and 1-hexene, the method further comprising replicating the contacting step in at least 1 additional polymerization run under identical polymerization conditions and with identical polymerizable olefin(s) and determining a catalyst productivity value for each polymerization run.

* * * * *